(No Model)
J. RACOW.
POT ATTACHMENT.
No. 582,684.  Patented May 18, 1897.
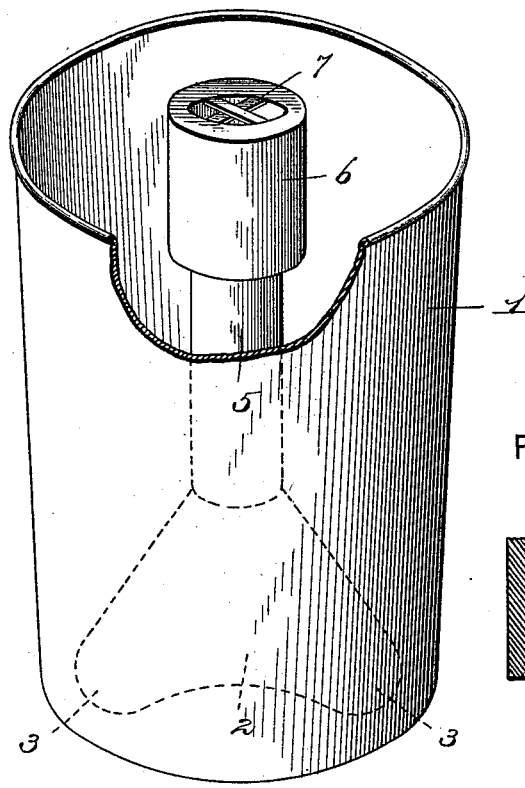
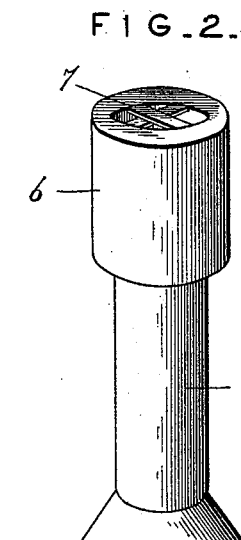
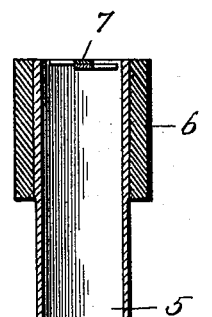
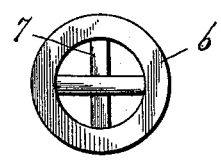
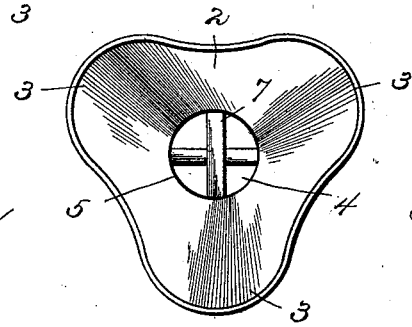
WITNESSES
Harry L. Ames
J. C. Tappan
INVENTOR
Joseph Racow.
by John Wedderburn
Attorney

UNITED STATES PATENT OFFICE.

JOSEPH RACOW, OF NEW HAVEN, CONNECTICUT.

POT ATTACHMENT.

SPECIFICATION forming part of Letters Patent No. 582,684, dated May 18, 1897.

Application filed September 9, 1896. Serial No. 605,307. (No model.)

*To all whom it may concern:*

Be it known that I, JOSEPH RACOW, a citizen of the United States, residing at New Haven, in the county of New Haven and State of Connecticut, have invented certain new and useful Improvements in Pot Attachments; and I do hereby declare the following to be a full, clear, and exact description of the invention, such as will enable others skilled in the art to which it appertains to make and use the same.

My invention relates to improvements in attachments for pots, kettles, and the like, the object of the same being to provide means whereby a boiling over of the liquid contents of the pot or kettle will be prevented.

The invention consists of an attachment having a cone-shaped bottom cut away along its lower edge at three or more points and provided with an opening at its apex, a tubular shank extending upwardly from said cone-shaped bottom, a weighted sleeve or collar upon the upper end of said tube, and cross-bars partially covering the opening through said sleeve.

The invention also consists in other details of construction and combinations of parts, which will be hereinafter more fully described and claimed.

In the drawings forming part of this specification, Figure 1 represents a perspective view of a pot or kettle partly broken away, showing my improved attachment applied to the inside thereof. Fig. 2 is a detail perspective view of the attachment. Fig. 3 is a bottom plan view of the same. Fig. 4 is a view of the upper end of the tubular shank, and Fig. 5 is a longitudinal section.

Like reference-numerals indicate like parts in the different views.

My improved attachment is adapted to be inserted into a pot or kettle 1, of any suitable form and construction, and is made up of a cone-shaped bottom piece 2, of tin or other suitable sheet metal, the lower edges of the same being cut away at three or more points, as shown at 3 3, so that a space is formed between the extreme lower edges of said conical bottom and the cut-away portions thereof. At the apex of the bottom piece 2 is formed an opening 4, from which extends upwardly a tubular shank 5, having a weighted sleeve or collar 6 upon its upper end. The opening through said sleeve or collar is partially covered by cross-bars 7 7, as clearly shown in Fig. 4. The said cross-bars 7 serve to prevent the collapse of the upper end of the shank 5, and also to prevent large heavy particles of material contained in the kettle 1 from passing up through and out of the upper end of the tubular shank 5.

In using my device the same is inserted into the pot or kettle 1, which is partially filled with milk or other liquid substance which is to be boiled, the upper end of the tubular shank 5 or the sleeve 6 thereof projecting slightly above the top edges of the pot 1. When the liquid begins to boil, it is forced upwardly through the tubular shank 5, and any overflow passes out between the cross-bars 7 and thence down into the pot 1 on the outside of the shank 5. A boiling over of the liquid from the pot 1 is thereby effectually obviated. The weighted sleeve or collar 6 serves the purpose of preventing the displacement of the attachment in the pot or kettle 1, and the cut-away portions 3 3 of the cone-shaped bottom 2 prevent too strong a flow of boiling liquid up through the tubular shank 5, permitting the passage of a small quantity on the outside of the attachment.

The device is extremely simple in construction, can be cheaply made, and will be found extremely effective for the purpose for which it was designed.

Having now described my invention, what I claim as new, and desire to secure by Letters Patent, is—

The combination with a pot or kettle, of an attachment therefor, the same consisting of a cone-shaped bottom having an opening at the apex thereof and the lower edges cut away at different points, the said attachment adapted to rest upon the bottom of said pot or kettle, a tubular shank leading upwardly from said bottom, a weighted sleeve or collar upon the upper end of said shank and cross-bars connecting the upper end of said shank and partially closing the opening therethrough, substantially as and for the purpose described.

In testimony whereof I have signed this specification in the presence of two subscribing witnesses.

JOSEPH RACOW.

Witnesses:
SAMUEL S. DOROFF,
BERNARD E. LYNCH.